United States Patent
Maeda

[11] Patent Number: 5,813,276
[45] Date of Patent: Sep. 29, 1998

[54] PRESS DIE OF CEMENT COMPOSITE AND A METHOD OF PRODUCING THE SAME

[76] Inventor: Naomi Maeda, 6-4, Kamihoncho, Sakata-shi, Yamagata 988, Japan

[21] Appl. No.: 797,657

[22] Filed: Jan. 31, 1997

Related U.S. Application Data

[63] Continuation of PCT/JP96/01904 Jul. 10, 1996.

[30] Foreign Application Priority Data

Jul. 13, 1995 [JP] Japan .................................. 7-2000438

[51] Int. Cl.⁶ .................................................... B21D 37/01
[52] U.S. Cl. ........................................... 72/462; 76/107.1
[58] Field of Search ..................... 72/462, 476; 76/107.1

[56] References Cited

U.S. PATENT DOCUMENTS 2,175,139  10/1939  Wilkie ..................................... 76/107.1
3,154,664  10/1964  Zeder, Jr. ............................... 76/107.1

FOREIGN PATENT DOCUMENTS 63-268522  11/1988  Japan .
2-268929   11/1990  Japan .

*Primary Examiner*—Lowell A. Larson
*Attorney, Agent, or Firm*—Cushman Darby & Cushman IP Group of Pillsbury Madison & Sutro LLP

[57] ABSTRACT

There are provided a press die of cement composite characterized in that a punch and a blank holder comprise respective cut portions of a punch and blank holder forming member formed by transfer using a master model or by shaving a hardened body block and a method of producing a press die of cement composite charactareized in that a punch and blank holder forming member is formed by transfer using a master model or shaving a hardened body block and said punch and blank holder forming member is separately cut along an outline of a punch while starting from an extending hole provided in said punch and blank holder forming member at a position corresponding to one point of said outline to form the punch and a blank holder, respectively.

According to the press die of the invention and the method of producing the press die of the invention, since the punch and the blank holder can be simultaneously formed, the production steps can be reduced and the production time can be shortened. In addition thereto, the facing portions of the punch and the blank holder assembled with each other have a uniform clearance provided therebetween and therefore the press die of high accuracy can be provided.

12 Claims, 3 Drawing Sheets

FIG. 1
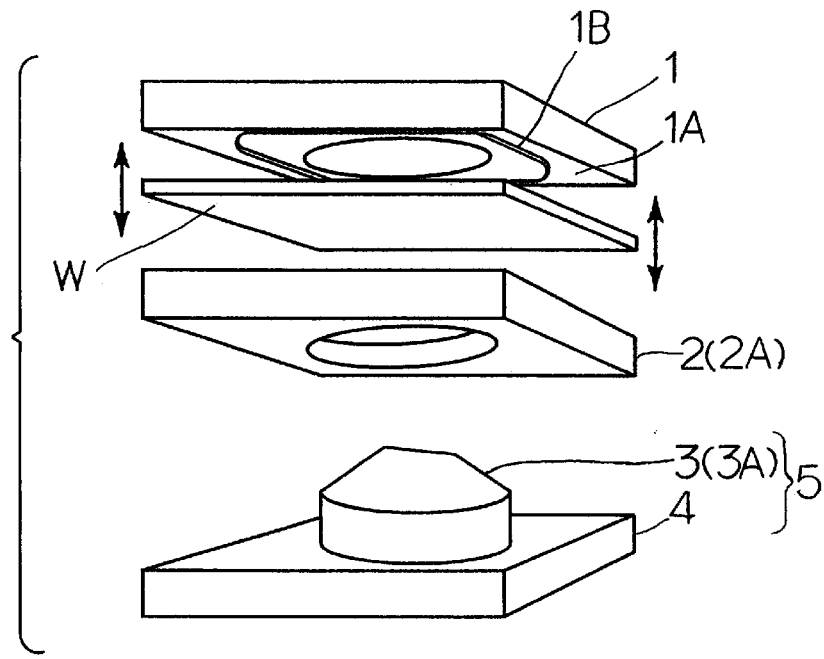
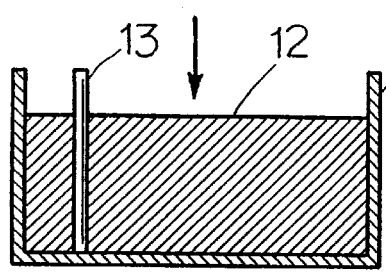
FIG. 2(A)
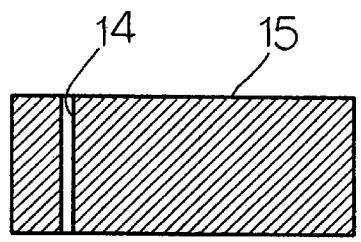
FIG. 2(B)
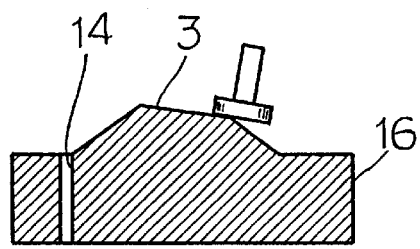
FIG. 2(C)

PRESS DIE OF CEMENT COMPOSITE AND A METHOD OF PRODUCING THE SAME

This is a Continuation of International Appln. No. PCT/JP96/01904 filed Jul. 10. 1996 which designated the U.S.

FIELD OF THE INVENTION

This invention relates to a press die of cement composite used for working a metal panel, a resin mould or the like and a method of producing the press die.

DESCRIPTION OF THE PRIOR ART

A press die used for punching, embossing or squeezing sheet material is typically formed of steel, cast metal or the like. Lately, press dies made of concrete have been used as they can be produced in a shorter time than dies made of steel and also can be made less expansively than steel dies.

Particularly, product having an uneven surface and formed of material which tends to be distorted when worked have been formed by a moulding method using a three-part press die comprising a female die 1, a blank holder 2 and a male die 5, which includes a punch 3 and a base plate 4, as shown in FIG. 1. Work material W, such as an iron plate, is securely placed between a die face 1A of the female die 1 and the blank holder 2, with a bead 1B on the female die 1 facing the work material. The female die 1 is moved toward the punch 3 of the male die 5 positioned below the work material W whereby it is press-worked while the blank holder 2 is positioned around the punch 3.

The press die of concrete is formed as follows. A plaster model which is used as a transfer medium is prepared and a moulding box is formed for forming the blank holder 2 or the punch 3 by using a face (modeling face) of the plaster model. Thereafter, concrete is placed into the moulding box to form the male die 5. In the production step, since either the blank holder 2 or the punch 3 is formed by a single transfer, two transfers are required to form both the blank holder 2 and the punch 3. Thereafter, the female die 1 is formed by transfer while using the male die 5 comprising the combination of blank holder 2 and the punch 3.

However, the conventional press die has various problems. Since the blank holder 2 and the punch 3 have to be separately formed within the individual moulding boxes with the female die 1 being used as the transfer medium, formation of the blank holder and punch is complicated and time-consuming. Also, since the blank holder 2 and the punch 3 are separately formed, it is difficult to form the blank holder 2 and the punch 3 so that the facing portions of the blank holder 2 and the punch 3 have a uniform clearance between them, when they are assembled with each other, which adversely affects the accuracy of the press-worked goods.

This invention is made in order to solve the conventional problems and an object of the invention is to provide a press die of cement composite adapted to be formed by a simpler production step and in a shortened time while press-worked goods of high accuracy can be produced.

SUMMARY OF THE INVENTION

According to the invention, a punch and a blank holder of the press die comprise parts formed by cutting a punch and blank holder forming member which may be formed of cement component by transfer using a master model or by grinding a hardened body block.

Also, according to the invention, a punch and blank holder forming member which may be formed of cement composite by transfer using a master model or by grinding a hardened body block has a punch and a blank holder divided to be separately formed by cutting the punch and blank holder forming member along an outline of a punch portion while starting from an extending or penetrating hole provided at one point in the outline of the punch portion and using a wire saw extending through the extending hole in the punch and blank holder forming member.

Furthermore, according to the invention, a punch and blank holder forming member which is formed of cement composite by transfer using a master model or by grinding a hardened body block is used as a transfer medium for forming a female die and a punch and a blank holder are separately formed by cutting the punch and blank holder forming member. In addition thereto, after the punch and the blank holder separately divided from the punch and blank holder forming member are again combined, the female die is formed while the recombined punch and blank holder forming member serves as the transfer medium therefor.

In this manner, since the punch and the blank holder can be simultaneously formed and therefore the female die can be formed, a press die of cement composite can be formed by a reduced production step and in a shortened time and the facing portions of the blank holder and the punch assembled with each other have a uniform clearance held between them, which allows the press die to be provided having a high working accuracy.

BRIEF DESCRIPTION OF THE DRAWINGS

FIG. 1 is an exploded perspective view of a press die;

FIG. 2(A) is a cross-sectional view of a moulding box with cement composite disposed therein;

FIG. 2(B) illustrates a method for forming a punch and blank holder forming member showing a cross-sectional view of a cement composite body removed from a moulding box;

FIG. 2(C) is a cross-sectional view of a cement composite body formed in a shape corresponding to a die to be produced;

DESCRIPTION OF BEST MODE OF THE INVENTION

Figure 3:
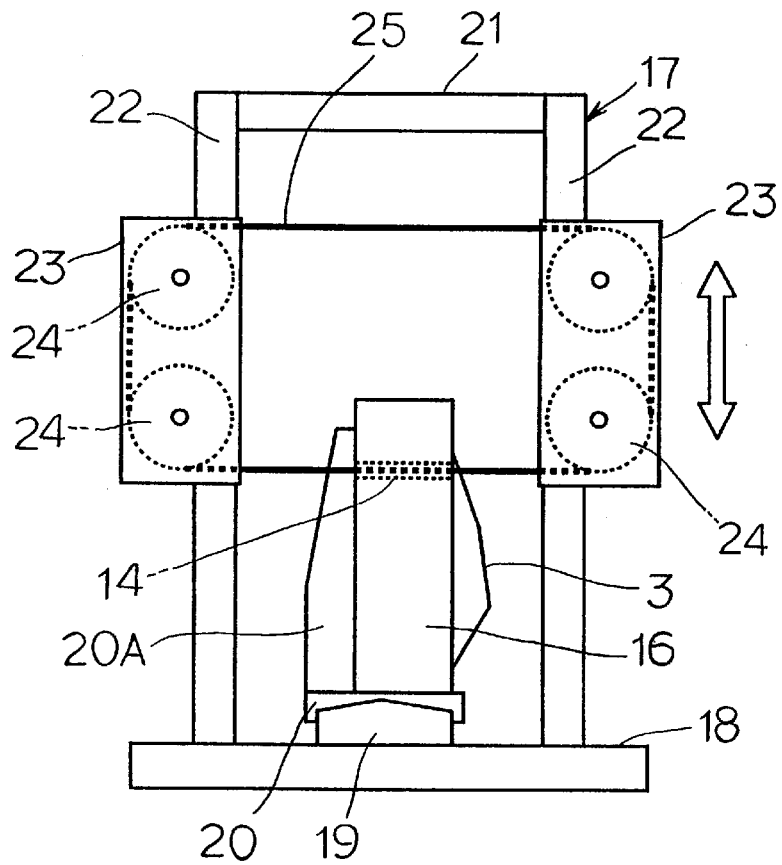
FIG. 3 is a side elevational view of a cutting apparatus for cutting a punch and blank holder forming member.

The invention will be described in more detail with reference to the accompanying drawings. In FIG. 2, reference numeral 11 designates a moulding box for forming a punch and blank holder forming member. Cement composite 12 is placed within the moulding box 11. An example of the cement composite 12 may comprise cement (80 parts by weight), ultra fine powder (20 parts by weight), high range water reducing agent (4 parts by weight), reinforcing fibers (7 parts by weight) and water (27.5 parts by weight). The thus obtained hardened body can be easily worked by shaving.

As shown in FIG. 2(A), a straight iron rod 13 having a diameter of about 5 mm is placed at a position corresponding to a spot on an outline of the punch 3 to be formed when the cement composite 12 is placed within the moulding box 11.

After the cement composite 12 is hardened, the thus obtained hardened body is taken out of the moulding box 11 and the iron rod 13 is withdrawn therefrom. Thus, a cement hardened body 15, is formed having an extending or penetrating hole 14 extending through the cement hardened body 15 in upward and downward directions as shown in FIG. 2(B). After that, the upper surface of the cement hardened body 15 is shaved so as to form a shape corresponding to that of the punch 3 with the penetrating hole 14 being not filled as shown in FIG. 2(C). The forming member 16 has a compressive strength of 1371 kgf/cm$^2$.

Figure 4:
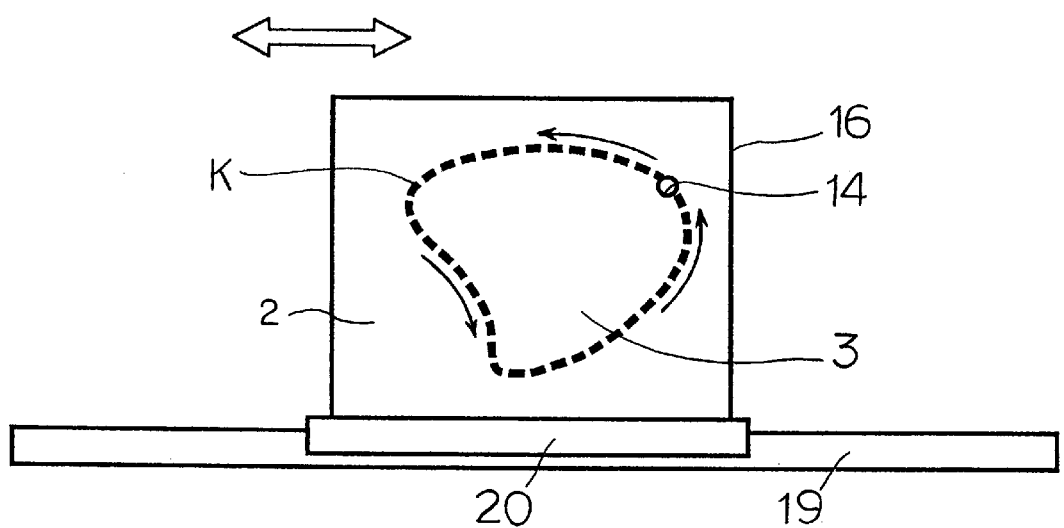
FIG. 4 illustrates a step of cutting the punch and blank holder forming member by means of the cutting apparatus.

The punch and blank holder forming member 16 is placed in a cutting apparatus 17 shown in FIGS. 3 and 4. The cutting apparatus 17 may mainly comprise a long bed 19 placed on an upper face of a bottom base 18 so that it extends in leftward and rightward directions, a sliding member 20 slidingly moving along the bed 19 in leftward and rightward directions, a gate type frame 21 provided over the bed 18, a pair of lifting members 23 and 23 moving along posts 22 and 22 of the frame 21 in upward and downward directions, a pair of upper and lower gears 24 and 24 rotatably supported on the respective lifting members 23 and 23 and an endless diamond wire saw 25 engaging the four gears 24 and 24 on the respective lifting members 23 and 23.

As shown in FIG. 4, the punch and blank holder forming member 16 is placed on the sliding member 20 of the cutting apparatus 17 while the upper and lower faces of the punch and blank holder forming member 16 are vertically positioned so that the penetrating hole 14 therein is maintained in a horizontal manner. As shown in FIG. 3, the punch and blank holder forming member 16 is secured to the sliding member 20 through a supporting member 20A. Thereafter, the one end of the diamond wire saw 25 extends through the penetrating hole 14 in the forming member 16, then engages the four gears 24, respectively and is finally connected to the other end of the wire saw 25 through a connecting member (not shown) to form the endless wire saw 25.

The gear 24 then rotate at high speed so that the diamond wire saw 25 moves while the lifting member 23 moves together with the gears 24 in upward and downward directions as viewed in FIG. 3 and the sliding member 20 moves together with the punch and blank forming member 16 along the bed 19 in leftward and rightward directions as viewed in FIG. 4. Thus, the punch and blank holder forming member 16 is cut along a cutting locus K corresponding to the outline of the punch 3 from the starting point of the extending hole 14 in the punch and blank holder forming member 16 as shown in FIG. 4.

When the punch and blank holder forming member 16 is entirely cut around the periphery of the portion corresponding to the punch 3 along the cutting locus K, the cutting operation by the wire saw 25 is terminated and the connecting member for connecting both ends of the wire saw 25 is cut off. Thereafter, the wire saw 25 is withdrawn out of the punch and blank holder forming member 16.

The punch and blank holder forming member 16 is then disassembled or divided along the cutting locus K thereof. The middle cut-out portion defines the punch 3 and the surrounding portion of member 16 defines the blank holder 2.

The thus formed punch 3 is securely placed on a base plate 4 formed of high strength concrete or the like to form a male die 5 as shown in FIG. 1 and the blank holder 2 is placed on the male die 5 so that the inner periphery of the blank holder 2 is faced to the outer periphery of the punch 3. A clearance between the punch 3 and the blank holder 2 thus assembled with each other is about 5 mm so that they are uniformly spaced to each other. This causes the punch 3 and the blank holder 2 to be produced with a high accuracy.

Figure 5A:
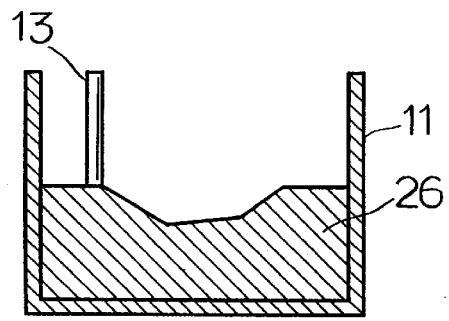
FIG. 5(A) illustrates an alternate method for forming a punch and blank holder forming member, showing a cross-sectional view of a plaster model installed into a moulding box as a transfer medium.

FIG. 5 illustrates an alternate method for forming the punch and blank holder forming member 16. A plaster model 26 is formed by transfer using a prepared master model of the male die 5 and the moulding box 11 for the punch and blank holder forming member is assembled with the plaster model 26 installed as a transfer medium as shown in FIG. 5(A).

Since the punch and blank holder forming member 16 is required to have the penetrating hole 14 provided therein for inserting the diamond wire saw 25 in the same manner as explained with reference to FIGS. 3 and 4, an iron rod 13 having a diameter of about 5 mm should be provided in the plaster model 26 at one point thereof within the moulding box 11.

Figure 5B:
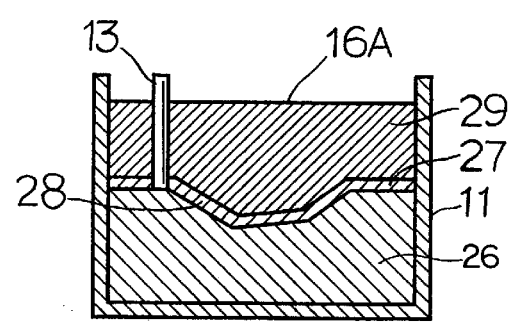
FIG. 5(B) is a cross-sectional view of the moulding box and plaster model, with first and second layers of cement composite poured therein.

In the moulding box 11 is placed cement composite 27 of excellent transfer property, comprising cement (80 parts by weight), ultra fine powder (20 parts by weight), iron powder (150 parts by weight), shrinkage reducing agent (1.5 parts by weight), admixture agent (15 parts by weight) and water (20 parts by weight). The thus mixed composite will be referred to as cement composite 27. A surface layer 28 having a thickness of about 5 mm is formed by the cement composite 27 as shown in FIG. 5(B). The compressive strength of the surface layer 28 has 1208 kgf/cm$^2$.

After the surface layer 28 is hardened, cement composite 29 of high strength comprising cement (80 parts by weight), fine aggregate (144 parts by weight), coarse aggregate (177 parts by weight), silica fume (20 parts by weight), mixed composite (2.1 parts by weight) and water (25 parts by weight) is placed in the moulding box 11. The thus mixed composite will be referred to as cement composite 29. Thus, a punch and blank holder forming member 16A of two layer construction inlcuding the surface layer 28 is formed. The hardened body of the cement composite 29 (the punch and blank holder forming member 16A) has a compressive strength of 1214 kgf/cm$^2$.

A punch 3A and a blank holder 2A are formed by cutting the punch and blank holder forming member 16A by means of the cutting apparatus 17 as shown in FIGS. 3 and 4 in the same manner as the punch 3 and the blank holder 2.

The thus formed punch 3A is securely placed on a base plate 4 formed of high strength concrete or the like to form a male die 5 as shown in FIG. 1 and the blank holder 2A is placed on the male die 5 so that the inner periphery of the blank holder 2A is faced to the outer periphery of the punch 3A. A clearance between the punch 3A and the blank holder 2A thus assembled with each other is about 5 mm so that they are uniformly spaced to each other. This causes the punch 3 and the blank holder 2 to be produced with a high accuracy.

Although, in the illustrated embodiments, the punch 3 (or 3A) and the blank holder 2 (or 2A) are formed by cutting and separating the punch and blank holder forming member 16 (or 16A) into the two components, a female die may be formed by using the punch 3 (or 3A) and the blank holder 2 (or 2A) as a transfer medium for forming a female die. As described in more detail with reference to FIG. 6, the punch 3 (or 3A) and the blank holder 2 (or 2A) formed as aforementioned are reassembled and clay 30A is filled in a space between the punch 3 (or 3A) and the blank holder 2 (or 2A) to secure them to each other so that no displacement occurs between them.

Figure 6A:
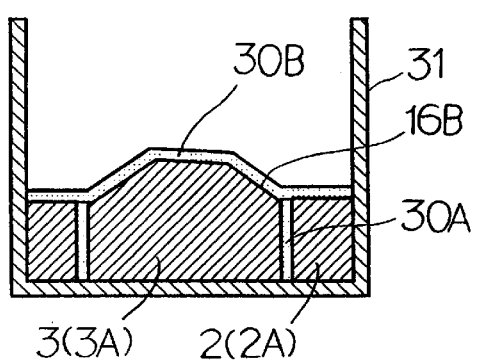
FIG. 6(A) illustrates a method for producing a female die showing a cross-sectional view of a moulding box in which a punch and blank holder are installed.

Thereafter, since the reassembled punch and blank holder forming member 16B is utilized as the transfer medium for forming the female die, a sheet-like wax 30B is adhered to the surface of the punch and blank holder forming member 16B as shown in FIG. 6(A). The punch and blank holder forming member 16B having the sheet-like wax 30B adhered thereto is placed in a moulding box 31 for forming a female die. Then, cement composite of excellent transfer property identical to the cement composite 17 described above is placed in the moulding box 31 to form a surface layer 32 having a thickness of about 10 to 20 mm.

After the surface layer 32 is hardened, cement composite of high strength identical to the cement composite 29 described above is placed on the surface layer 32 in the moulding box 31 to form a female die 1 of two layer construction having the surface layer 32. Finally, the female die 1 is removed from the moulding box 31 after it is hardened and then the punch and blank holder forming member 16B is disassembled into the blank holder 2 (or 2A) and the punch 3 (or 3A). Thus, the three parts of the press die can be formed.

In an alternative method of forming the female die 1, the punch and blank holder forming member 16 formed in the manner as illustrated in FIG. 2(C) may be utilized as a transfer medium for forming the female die.

This method will be described with reference to FIG. 6 wherein the combination of the punch 3 (or 3A) and the blank holder 2 (or 2A) is used as the punch and blank holder forming member 16.

A sheet-like wax 30B is adhered to the surface of the punch and blank holder forming member 16 and the thus obtained punch and blank holder forming member 16 having the sheet-like wax 30B adhered thereto is placed in the moulding box 31 for forming the female die.

Figure 6B:
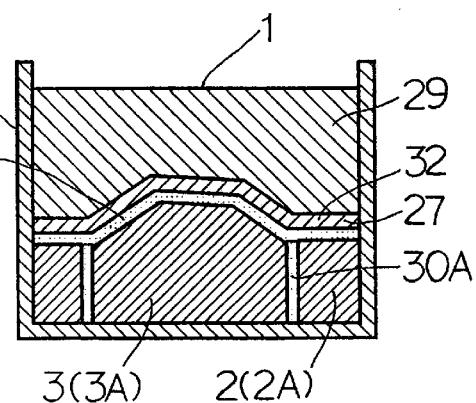
FIG. 6(B) is a cross-sectional view of the moulding box, punch, and blank holder with first and second layers of cement composite poured therein.

Then, cement composite of excellent transfer property identical to the cement composite 27 described above is placed in the moulding box 31 to form a surface layer 32 having a thickness of about 10 to 20 mm as illustrated in FIG. 6(B).

After the surface layer 32 is hardened, cement composite of high strength identical to the cement composite 29 described above is placed on the surface layer 32 in the moulding box 31 to form a female die 1 of two layer construction having the surface layer 32. Finally, the punch and blank holder forming member 16 used as the transfer medium for forming the female die is cut by the cutting apparatus in the same manner as described above and divided into the punch 3 and the blank holder 2.

As described above, the press die of cement composite constructed in accordance with the invention can be advantageously used for a metal pannel or resin mould or the like.

I claim:

1. A press die formed of a cement composite, comprising a punch and a blank holder, each being formed from respective cut portions of a single punch and blank holder forming member, said single punch and blank holder forming member having a two layer construction including a surface layer of cement composite having excellent transfer properties and a layer of cement composite of high strength integrally formed with the surface layer.

2. The press die of claim 1 wherein a shape of the punch and of the blank holder is defined in the punch and blank holder forming member by transfer from a master punch and blank holder forming member model to the surface layer.

3. A press die formed of cement composite, comprising a punch and a blank holder, each being formed from respective cut portions of a single punch and blank holder forming member, said single punch and blank holder forming member comprising a shaved hardened body block of material having excellent shaving properties.

4. A method of producing a press die of cement composite, comprising the steps of:

preparing a punch and blank holder forming member having a two-layer construction including a surface layer of a cement composite having excellent transfer properties and a layer of cement composite of high strength integrally formed with the surface layer;

providing a penetrating hole through the punch and blank holder forming member at a position on an outline of a punch to be formed from the punch and blank holder forming holder; and cutting the punch and blank holder forming member with a wire saw along the outline of the punch to be formed starting at the penetrating hole to separate the punch and blank holder forming member into a punch and a blank holder.

5. The method of claim 4 further comprising forming a shape of the punch and blank holder forming member by transfer from a master punch and blank holder forming member model to the surface layer.

6. The method of claim 4 further comprising the steps of reassembling the punch and the blank holder into a reassembled punch and blank holder forming member and forming a female die by transfer from the reassembled punch and blank holder forming member.

7. A method of producing a press die of cement composite, comprising the steps of:

preparing a punch and blank holder forming member by shaving a hardened body block of material having excellent shaving properties;

providing a penetrating hole through the punch and blank holder forming member at a position on an outline of a punch to be formed from the punch and blank holder forming holder; and cutting the punch and blank holder forming member with a wire saw along the outline of the punch to be formed starting at the penetrating hole to separate the punch and blank holder forming member into a punch and a blank holder.

8. The method of claim 7 further comprising the steps of reassembling the punch and the blank holder into a reassembled punch and blank holder forming member and forming a female die by transfer from the reassembled punch and blank holder forming member.

9. A method of producing a press die of cement composite, comprising the steps of:

forming a female die by transfer from a punch and a blank holder forming member, the punch and blank holder forming member being formed by either transfer from a master punch and blank holder forming member model or shaving a hardened body block; and dividing the punch and blank holder forming member into a separate punch and blank holder.

10. A press die of cement composite comprising:
   a punch;
   a blank holder,
   said punch and blank holder being formed from respective cut portions of a single punch and blank holder forming member; and
   a female die formed by transfer from said punch and said blank holder reassembled into a single punch and blank holder forming member.

11. The press die of claim 10 wherein said punch and blank holder forming member has a two layer construction including a surface layer of cement composite having excellent transfer properties and a layer of cement composite of high strength integrally formed with said surface layer.

12. The press die of claim 10 wherein said punch and blank holder forming member comprises a shaved hardened body block of material having excellent shaving properties.

* * * * *